United States Patent
Toyama et al.

(10) Patent No.: US 11,783,623 B2
(45) Date of Patent: Oct. 10, 2023

(54) SYNTHESIZING APPARATUS, SYNTHESIZING METHOD AND PROGRAM

(71) Applicant: NEC Corporation, Tokyo (JP)

(72) Inventors: Hiroaki Toyama, Tokyo (JP); Mamoru Inoue, Tokyo (JP)

(73) Assignee: NEC CORPORATION, Tokyo (JP)

(*) Notice: Subject to any disclaimer, the term of this patent is extended or adjusted under 35 U.S.C. 154(b) by 35 days.

(21) Appl. No.: 17/514,069

(22) Filed: Oct. 29, 2021

(65) Prior Publication Data

US 2022/0114358 A1    Apr. 14, 2022

Related U.S. Application Data

(63) Continuation of application No. 16/343,526, filed as application No. PCT/JP2017/038068 on Oct. 20, 2017, now Pat. No. 11,188,733.

(30) Foreign Application Priority Data

Oct. 21, 2016    (JP) .................................. 2016-206879

(51) Int. Cl.
  *G06K 9/00*    (2022.01)
  *G06V 40/12*    (2022.01)
  (Continued)

(52) U.S. Cl.
  CPC ........ *G06V 40/1347* (2022.01); *G06F 18/211* (2023.01); *G06F 18/23213* (2023.01);
  (Continued)

(58) Field of Classification Search
  CPC .. G06K 9/00; G06K 9/00221; G06K 9/00979; G06K 9/00093; G06K 9/0067;
  (Continued)

(56) References Cited

U.S. PATENT DOCUMENTS

| 4,685,146 A | 8/1987 | Schiller | G06K 9/00067 |
| | | | 382/272 |
| 6,134,340 A | 10/2000 | Hsu | G06K 9/00087 |
| | | | 382/124 |

(Continued)

FOREIGN PATENT DOCUMENTS

| JP | 2000-163572 A | 6/2000 |
| JP | 2001-344604 A | 12/2001 |

(Continued)

OTHER PUBLICATIONS

Sagar et al., "Hybrid Fuzzy Logic and Neural Network Model for Fingerprint Minutiae Extraction", IEEE, pp. 3255-3259 (Year: 1999).*

(Continued)

*Primary Examiner* — Duy M Dang

(57) ABSTRACT

A synthesizing apparatus comprises: an input part that inputs a plurality of feature point sets that are respectively extracted by a plurality of methods from an input image having a curved stripes pattern formed by ridges; and a synthesizing part that synthesizes the plurality of feature point sets by executing a logical operation on the plurality of feature point sets. The synthesizing part can execute a logical OR operation on the plurality of feature point sets. The synthesizing part can also execute a logical AND operation on the plurality of feature point sets.

13 Claims, 21 Drawing Sheets

(51) Int. Cl.
  *G06T 7/00* (2017.01)
  *G06T 7/60* (2017.01)
  *G06F 18/211* (2023.01)
  *G06F 18/25* (2023.01)
  *G06F 18/23213* (2023.01)
  *G06V 10/771* (2022.01)
  *G06V 10/80* (2022.01)

(52) U.S. Cl.
  CPC .............. *G06F 18/253* (2023.01); *G06T 7/00* (2013.01); *G06T 7/60* (2013.01); *G06V 10/771* (2022.01); *G06V 10/806* (2022.01); *G06V 40/1371* (2022.01)

(58) Field of Classification Search
  CPC .. G06K 9/4633; G06K 9/6223; G06K 9/6228; G06K 9/629; G09G 5/137; G09G 2340/0492; G09G 2354/00; G06F 3/04845; G06T 3/60; G06T 7/00; G06T 7/60
  See application file for complete search history.

(56) References Cited

U.S. PATENT DOCUMENTS

| | | | |
|---|---|---|---|
| 6,466,686 B2 | 10/2002 | Senior | G06K 9/00067 382/124 |
| 6,546,122 B1 | 4/2003 | Russo | |
| 7,035,444 B2 | 4/2006 | Kunieda | G06K 9/00067 382/125 |
| 7,526,110 B2 | 4/2009 | Niinuma et al. | |
| 8,369,583 B2 | 2/2013 | Yoshimine et al. | |
| 2001/0031075 A1 | 10/2001 | Fujii | |
| 2002/0154795 A1 | 10/2002 | Lee | G06T 3/0006 382/125 |
| 2004/0151352 A1 | 8/2004 | Nakajima et al. | |
| 2006/0078177 A1 | 4/2006 | Niinuma et al. | |
| 2010/0284575 A1 | 11/2010 | Yoshimine et al. | |

FOREIGN PATENT DOCUMENTS

| | | |
|---|---|---|
| JP | 2004-164181 A | 6/2004 |
| JP | 2004-192633 A | 7/2004 |
| JP | 2006-012080 A | 1/2006 |
| JP | 2006-107340 A | 4/2006 |
| JP | 2010-040011 A | 2/2010 |
| JP | 2011-076369 A | 4/2011 |
| JP | 2015-228070 A | 12/2015 |
| WO | 2009/096475 A1 | 8/2009 |

OTHER PUBLICATIONS

JP Office Action for JP Application No. 2021-159751, dated Aug. 30, 2022 with English Translation.
D. Maltoni, Handbook of Fingerprint Recognition, Springer, 2003, pp. 83-113.
International Search report for PCT/JP2017/038066, dated Jan. 23, 2018.
Communication dated Sep. 26, 2019, from the European Patent Office in counterpart European Application No. 17862382.3.
Lu Jiang et al., "A Direct Fingerprint Minutiae Extraction Approach Based on Convolutional Neural Networks", 2016 International Joint Conference on Neural Networks, Jul. 24, 2016, pp. 571-578 (8 pages total).
Japanese Decision to Grant for JP Application No. 2020-109466 dated Aug. 31, 2021 with English Translation.

* cited by examiner

FIRST FEATURE POINT SET

| FEATURE POINT | COORDINATES | FEATURE POINT DIRECTION | TYPE |
|---|---|---|---|
| 251 | (X1,Y1) | θ1 | END POINT |
| 252 | (X2,Y2) | θ2 | BRANCH POINT |
| 253 | (X3,Y3) | θ3 | END POINT |
| 254 | (X4,Y4) | θ4 | BRANCH POINT |

FIG. 9A

SECOND FEATURE POINT SET

| FEATURE POINT | COORDINATES | FEATURE POINT DIRECTION | TYPE |
|---|---|---|---|
| 261 | (X5,Y5) | θ5 | BRANCH POINT |
| 262 | (X2,Y2) | θ6 | BRANCH POINT |
| 263 | (X3,Y3) | θ7 | BRANCH POINT |
| 264 | (X6,Y6) | θ8 | END POINT |

FIG. 9B

FEATURE POINT SET AFTER SYNTHESIZING

| FEATURE POINT | COORDINATES | FEATURE POINT DIRECTION | TYPE | NOTE |
|---|---|---|---|---|
| 271 | (X1, Y1) | 81 | END POINT | FORMER FEATURE POINT 251 |
| 272 | (X5, Y5) | 85 | BRANCH POINT | FORMER FEATURE POINT 253 |
| 273 | (X4, Y4) | 84 | BRANCH POINT | FORMER FEATURE POINT 254 |
| 274 | (X6, Y6) | 86 | END POINT | FORMER FEATURE POINT 256 |
| 275 | (X2, Y2) | 82b | BRANCH POINT | SYNTHESIS OF FORMER 252 AND 255 |
| 276 | (X3, Y3) | — | — | SYNTHESIS OF FORMER 253 AND 257 |

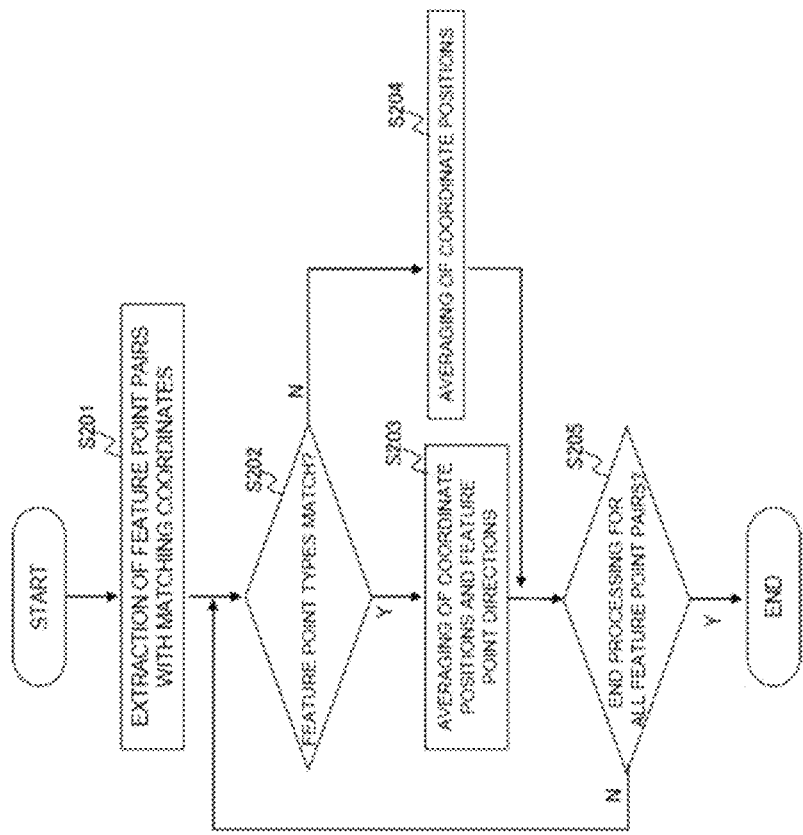

FEATURE POINT SET AFTER SYNTHESIZING

| FEATURE POINT | COORDINATES | FEATURE POINT DIRECTION | TYPE | NOTE |
|---|---|---|---|---|
| 281 | (X2, Y2) | 026 | BRANCH POINT | SYNTHESIS OF FORMER 252 AND 262 |
| 282 | (X3, Y3) | — | — | SYNTHESIS OF FORMER 253 AND 263 |

SYNTHESIZING APPARATUS, SYNTHESIZING METHOD AND PROGRAM

CROSS-REFERENCE TO RELATED APPLICATIONS

The present application is a continuation application of U.S. patent application Ser. No. 16/343,526 filed on Apr. 19, 2019, which is a National Stage Entry of international application PCT/JP2017/038068, filed Oct. 20, 2017, which claims the benefit of priority from Japanese Patent Application 2016-206879 filed on Oct. 21, 2016, the disclosures of all of which are incorporated in their entirety by reference herein.

TECHNICAL FIELD

The present invention relates to a synthesizing apparatus, a synthesizing method and a program. In particular the invention relates to a synthesizing apparatus, a synthesizing method and a program which handle a set including feature points extracted from an image having a curved stripes pattern formed by ridges.

BACKGROUND

A finger print or a palm print having a curved stripes pattern formed by many ridges has been used as a means of identifying a person for a long time now. In particular, matching a finger print left behind at the scene of a crime is used as an effective investigation means. Finger print matching systems using a computer have been installed in many police agencies. By comparing respective feature points of fingerprints left behind that are harvested at the scene of a crime with fingerprint images recorded in a database, a person corresponding to the left-behind fingerprint is identified.

In the feature points used in fingerprint matching, end points and branch points of fingerprint ridges are often used. For example, feature point matching using end points and branch points of fingerprint ridges are used, as disclosed in "4.3 Minutiae-Based Methods" of Non-Patent Literature (NPL) 1.

Patent Literature (PTL) 1 discloses technology for providing a fingerprint image processing apparatus that can extract a fingerprint image to be a target for matching with good accuracy. Patent Literature 1 discloses characterizing the direction of feature points extracted from a fingerprint image, according to rotational direction with respect to a reference point.

PTL 1

Japanese Patent Kokai Publication No. JP2015-228070A

Non Patent Literature

NPL1

D. Maltoni, "Handbook of Fingerprint Recognition", Springer, 2003

SUMMARY

It is to be noted that the respective disclosures of the abovementioned cited technical literature are incorporated herein by reference thereto. The following analysis is given according to the present inventors.

There is a wide range of usage of fingerprint images, such as in individual authentication in entry and exit management, and criminal identification in a criminal investigation. In using these fingerprint images, by extracting feature points from the fingerprint images and comparing the extracted feature points with feature points extracted from images stored in a database or the like, there are common points with regard to authentication and individual identification.

However, in fingerprint image usage (usage case), requirements differ with respect to feature points extracted from the fingerprint images (more precisely, a set or feature vector formed from a plurality of feature points). For example, in a case of using a left-behind fingerprint in identifying a suspect in a criminal investigation, completeness in feature points is required, in order that a suspect's fingerprints are not lost. That is, even with feature points considered to be of low quality, it is desirable to have completeness in extraction, and to compare with the information of the database.

Meanwhile, in a case of being used for individual authentication or the like, in order to reduce misjudgments (rejecting the person himself, accepting someone else), accuracy is required in feature points extracted from fingerprint images obtained by a scanner apparatus or the like. That is, along with feature points that are influenced by the environment when obtaining a fingerprint being excluded in advance and recorded in a database, it is desirable that such feature points of low quality also be excluded when matching.

It is to be noted that it is preferable for there to be a feature point extraction method (feature point extraction algorithm) enabling complete extraction of high quality feature points, but each feature point extraction method has a particular character, and in actuality no universal algorithm exists.

It is an object of the present invention to provide a synthesizing apparatus, a synthesizing method and a program to extract feature points suitable for usage application.

According to a first aspect of the present invention and disclosure, a synthesizing apparatus includes: an input part that inputs a plurality of feature point sets respectively extracted by a plurality of methods from an input image having a curved stripes pattern formed by ridges; and a synthesizing part that synthesizes the plurality of feature point sets by executing a logical operation on the plurality of feature point sets.

According to a second aspect of the present invention and disclosure a synthesizing method includes: inputting a plurality of feature point sets extracted by a plurality of methods from an input image having a curved stripes pattern formed by ridges; and synthesizing the plurality of feature point sets by executing a logical operation on the plurality of feature point sets.

According to a third aspect of the present invention and disclosure a program that causes a computer to execute processing includes: inputting a plurality of feature point sets extracted by a plurality of methods from an input image having a curved stripes pattern formed by ridges; and synthesizing the plurality of feature point sets by executing a logical operation on the plurality of feature point sets.

It is to be noted that this program may be recorded on a computer-readable storage medium. The storage medium may be non-transient such as semiconductor memory, a hard disk, a magnetic recording medium, an optical recording medium or the like. The present invention may be embodied as a computer program product.

According to the present invention and respective viewpoints of the disclosure, a synthesizing apparatus, a synthesizing method and a program are provided that contribute to extracting feature points suitable for usage application.

BRIEF DESCRIPTION OF DRAWINGS

FIGS. 9A and 9B are diagrams illustrating operations of a synthesizing part in the synthesizing apparatus.

FIG. 13 is a flow chart illustrating an example of operations when the synthesizing part synthesizes 2 feature point sets by a logical AND operation.

PREFERRED MODES

Figure 1:
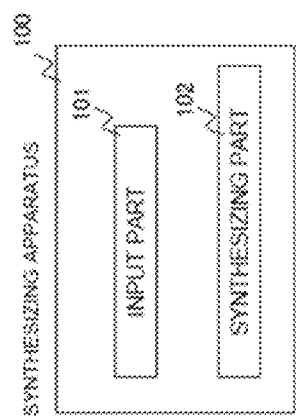
FIG. 1 is a diagram illustrating an outline of an example embodiment.

First, a description is given concerning an outline of an example embodiment. It is to be noted that reference symbols in the drawings attached to this outline are added to respective elements for convenience as examples in order to aid understanding, and there is no intention to limit the invention in any way.

A synthesizing apparatus 100 according to an example embodiment is provided with: an input part 101 that inputs a plurality of feature point sets that are respectively extracted using a plurality of methods from an input image having a pattern of curved stripes (termed "curved stripes pattern" herein) formed by ridges, and a synthesizing part 102 that synthesizes the plurality of feature point sets by executing logical operations on the plurality of feature point sets.

The feature point sets inputted to the synthesizing apparatus 100 are extracted by different methods (algorithms). In actuality there are strengths and weaknesses in each method; specifically, there are algorithms specialized for fingerprint images having particular features. In the synthesizing apparatus 100 according to the example embodiment, with regard to the feature point sets extracted by the respective algorithms, a logical operation (for example, logical OR operation, logical AND operation) is executed, and a plurality of feature point sets are synthesized into 1 feature point set. On such an occasion, by suitably selecting a logical operation executed by the synthesizing apparatus 100, it is possible to extract a feature point set that realizes a purpose. For example, in a case of selecting, without omission, feature points extracted by a plurality of algorithms, a logical OR operation may be executed. Or, in a case where it is desired that only high quality feature points extracted by the plurality of algorithms remain, a logical AND operation may be executed.

A more detailed description is given concerning specific example embodiments below, making reference to the drawings. It is to be noted that in each of the example embodiments, the same symbols are attached to the same configuration elements and descriptions thereof are omitted. Connection lines between blocks in respective diagrams may be bidirectional or unidirectional. Unidirectional arrows schematically show flow of main signals (data), but do not exclude bidirectionality.

First Example Embodiment

A more detailed description is given concerning a first example embodiment, using the drawings.

Figure 2:
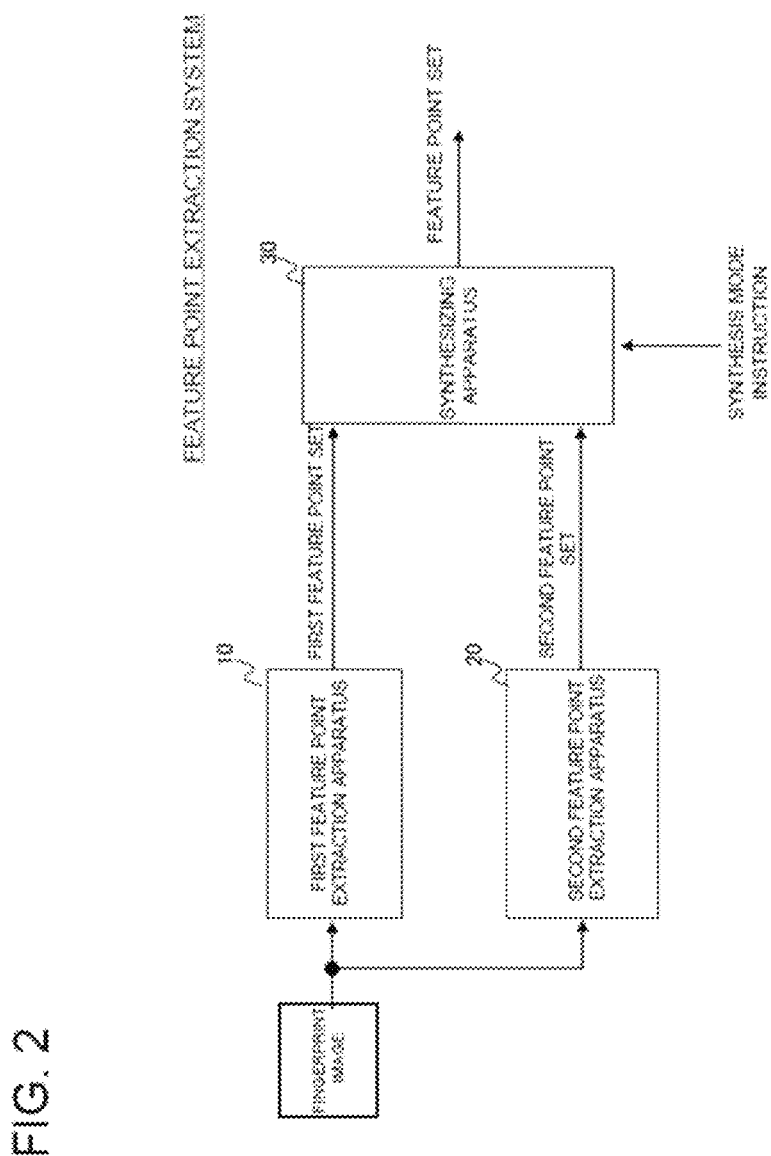
FIG. 2 is a diagram illustrating an example of a configuration of a feature point extraction system according to a first example embodiment.

FIG. 2 is a diagram illustrating an example of a configuration of a feature point extraction system according to the first example embodiment. Referring to FIG. 2, the feature point extraction system is configured to include a first feature point extraction apparatus 10, a second feature point extraction apparatus 20, and a synthesizing apparatus 30.

Fingerprint images are inputted to each of the first feature point extraction apparatus 10 and the second feature point extraction apparatus 20. Each of the first feature point extraction apparatus 10 and the second feature point extraction apparatus 20 extract feature points from fingerprint images inputted according to methods (algorithms) that differ from one another.

A set of feature points extracted by the first feature point extraction apparatus 10 is denoted "first feature point set". Similarly, a set of feature points extracted by the second feature point extraction apparatus 20 is denoted "second feature point set".

The synthesizing apparatus 30 receives the first and the second feature point sets as input. An operator of the feature point extraction system inputs a "synthesis mode instruction" to the synthesizing apparatus 30. The synthesizing apparatus 30 synthesizes the first and second feature point sets according to the synthesis mode instruction, and outputs the feature point sets as feature amount characterizing the fingerprint images inputted to the system. That is, the synthesizing apparatus 30 is an apparatus that synthesizes two or more feature point sets, and generates one feature point set.

<Hardware Configuration>

Next a description is given of a hardware configuration of various types of apparatus configuring the feature point extraction system according to the first example embodiment.

Figure 3:
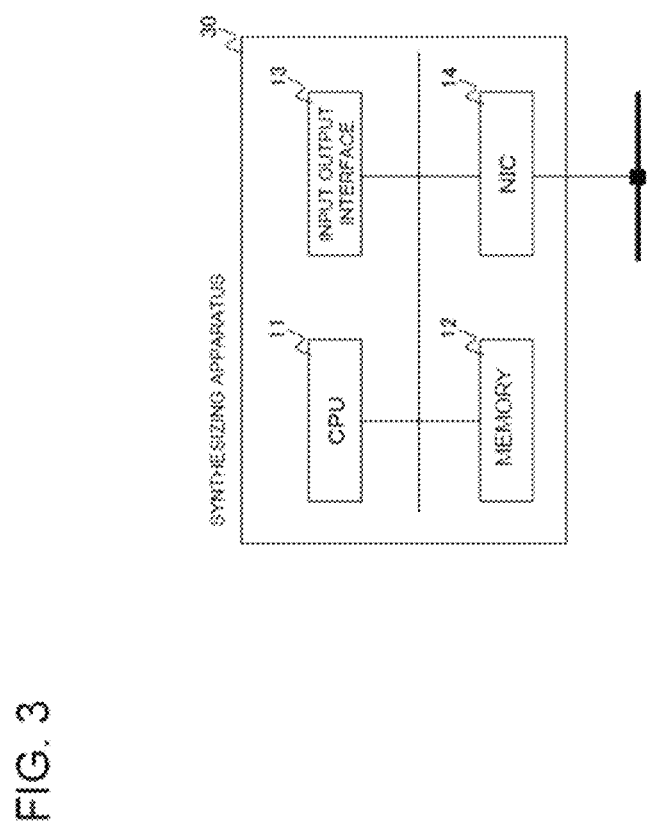
FIG. 3 is a diagram illustrating an example of a hardware configuration of a synthesizing apparatus according to the first example embodiment.

FIG. 3 is a block diagram illustrating an example of a hardware configuration of the synthesizing apparatus 30 according to the first example embodiment.

The synthesizing apparatus 30 is realized by a so-called information processing apparatus (computer), and, for example, is provided with a configuration exemplified in FIG. 3. For example, the synthesizing apparatus 30 is provided with a CPU (Central Processing Unit) 11, a memory 12, an input-output interface 13 and an NIC (Network Interface Card) 14 that is a communication means, connected together by an internal bus.

However, the configuration illustrated in FIG. 3 is not intended to be limited to the hardware configuration of the synthesizing apparatus 30. The synthesizing apparatus 30 may include hardware not shown in the drawings, and need not be provided with the input output interface 13 or the NIC 14, in accordance with requirements. The number of CPUs included in the synthesizing apparatus 30 is not limited to the example shown in FIG. 3, and for example, a plurality of CPUs may be included in the synthesizing apparatus 30.

The memory 12 may be RAM (Random Access Memory), ROM (Read Only Memory), or an auxiliary storage apparatus (hard disk etc.).

The input-output interface 13 is a means that forms an interface for a display apparatus or input apparatus not shown in the drawings. The display apparatus is, for example, a liquid crystal display or the like. The input apparatus is, for example, an apparatus that receives a user operation such as that of a keyboard, a mouse, or the like. The input apparatus includes an external storage apparatus such as a USB (Universal Serial Bus) memory or the like.

Functionality of the synthesizing apparatus 30 is realized by various types of processing module described later. The processing modules in question, for example, are realized by the CPU 11 executing a program stored in the memory 12. The program may be downloaded via a network, or may be updated using a storage medium that stores the program. Furthermore, the abovementioned processing modules may be realized by a semiconductor chip. That is, it is sufficient to have a means that executes functions performed by the abovementioned processing modules, by some type of hardware and/or software.

It is to be noted that since hardware configurations of the first feature point extraction apparatus or second feature point extraction apparatus may be similar to the synthesizing apparatus 30, detailed descriptions are omitted.

Continuing, a description is given concerning a processing configuration (processing module) of respective apparatuses.

<First Feature Point Extraction Apparatus>

Figure 4:
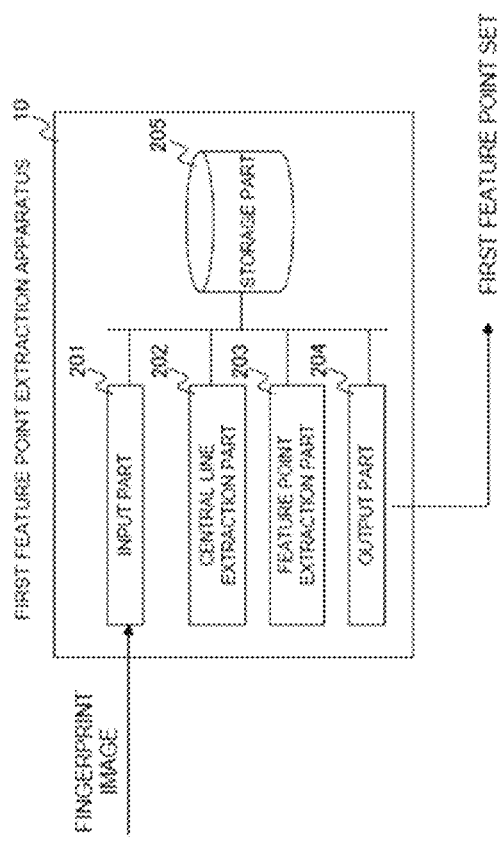
FIG. 4 is a diagram illustrating an example of a processing configuration of a first feature point extraction apparatus.

FIG. 4 is a diagram illustrating an example of a processing configuration of the first feature point extraction apparatus 10. Referring to FIG. 4, the first feature point extraction apparatus 10 is configured to include an input part 201, a central line extraction part 202, a feature point extraction part 203, an output part 204, and a storage part 205. It is to be noted that respective parts of the input part 201 and the like are configured to enable transfer of data between them, and access is possible to data stored in the storage part 205.

The input part 201 is a means for inputting data related to a fingerprint image from outside (image having a curved stripes pattern formed by ridges). For example, the input part 201 takes in digital data (image files) of fingerprint images stored in an external storage medium such as a USB memory or the like, and delivers the data to the central line extraction part 202. The input part 201 may input data related to the fingerprint image via a network. Or, rather than a configuration for inputting a fingerprint image digitized by a scanner or the like, the digitized fingerprint image may be obtained by installing a scanner function in the input part 201. It is to be noted that in a case of obtaining the fingerprint image by a scanner, the first feature point extraction apparatus 10 provides the image in question to the second feature point extraction apparatus 20.

Standards exist for the fingerprint image. Specifically, there exists ANSI/NIST-ITL-1-2000 Data Format for the Interchange of Fingerprint, Facial, & Scar Mark & Tattoo (SMT) Information, standardized by the US National Institute of Standards and Technology. It is preferable that the input part 201 handles fingerprint images digitized based on the abovementioned standard (for example, fingerprint images of 500 dpi resolution).

The central line extraction part 202 is a means for extracting a central line from a fingerprint image that has been obtained. It is to be noted that the central line extraction part 202 may use a central line extraction method disclosed in "3 Fingerprint Analysis and Representation" of Non-Patent Literature 1. Therefore, while a detailed description regarding extraction of a central line is omitted, in summary the central line extraction part 202 extracts the central line according to the following procedure.

The central line extraction part 202 extracts the directions of ridges of the fingerprint image. The central line extraction part 202 highlights each ridge in the direction of the ridge in question, and generates a binary image. The central line extraction part 202, by having the binary image as the central line, extracts the central line data (central line image). For example, the central line extraction part 202 generates a central line image as shown in FIG. 5.

The feature point extraction part 203 is a means for extracting feature points from the central line image. Information extracted by the feature point extraction part 203 includes position of feature point, type of feature point (branch point, end point), and direction characterizing the feature point in question according to direction (denoted below as feature point direction).

The feature point extraction part 203 extracts, as feature points, a branch point and end point of the central line, from the central line image generated by the central line extraction part 202. It is to be noted that in the process of extracting feature points from the central line image, it is possible to use a feature point extraction method disclosed in "3 Fingerprint Analysis and Representation" of Non-Patent Literature 1. Thus, a detailed description related to feature point extraction is omitted.

Figure 5:
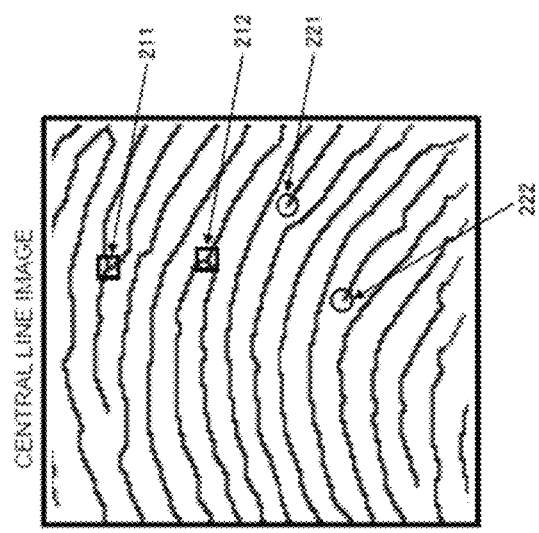
FIG. 5 is a diagram illustrating operations of a central line extraction part.

For example, the feature point extraction part 203 extracts branch points 211, 212, or end points 221, 222, as feature points as shown in FIG. 5, and records position and type (branch point, end point) of each feature point in the storage part 205. It is to be noted that in FIG. 5 and following diagrams, a branch point is denoted as a white square, and an end point is denoted as a white circle. Feature points (branch point, end point) illustrated in respective diagrams including FIG. 5 are configured for convenience in descriptions, and this does not comprehensively indicate correct feature points to be extracted from respective diagrams.

When extraction of feature points is completed, the feature point extraction part 203 calculates feature point direction related to each feature point. For example, if the extracted feature point is a branch point, the feature point extraction part 203 determines, as the feature point direction, a direction bisecting the smallest internal angle determined from three central lines forming a feature point. For example, the feature point direction 232 of the branch point 231 shown in FIG. 6A is calculated.

If the extracted feature point is an end point, the feature point extraction part 203 traces a fixed distance on a central line forming the end point and calculates a terminal point. The feature point extraction part 203 calculates the direction linking the end point and the terminal point as a feature point direction of the end point. For example, the feature point direction 242 of the end point 241 shown in FIG. 6B is calculated.

Figure 6C:
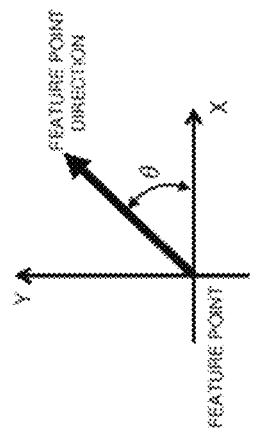
FIGS. 6A-6C are diagrams illustrating operations of a feature point extraction part.
Figure 6B:
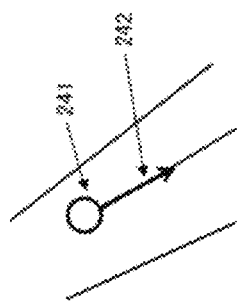
Figure 6A:
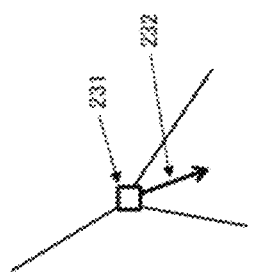

It is to be noted that the feature point direction, as shown in FIG. 6C, is denoted as a feature amount using an angle θ formed by an X axis in a 2-dimensional coordinate system within a fingerprint image, and a straight line in the feature point direction.

The feature point extraction part 203 delivers information related to the extracted feature point (feature point position, type, feature point direction) to the output part 204.

The output part 204 outputs information related to the feature points extracted by the feature point extraction part 203 to the synthesizing apparatus 30 as a first feature point set. It is to be noted that any mode is possible for data transfer between the first feature point extraction apparatus 10 and the synthesizing apparatus 30. For example, data related to the first feature point set may be inputted to the synthesizing apparatus 30 via a network. Or, data related to the first feature point set may be inputted to the synthesizing apparatus 30 using a USB memory or the like. The output part 204 may output not only feature points (first feature point set) extracted from the fingerprint image, but also in combination with fingerprint images to the synthesizing apparatus 30.

<Second Feature Point Extraction Apparatus>

It is to be noted that since processing configuration related to the second feature point extraction apparatus 20 may be similar to the first feature point extraction apparatus 10, a detailed description is omitted. A point of difference between the first feature point extraction apparatus 10 and the second feature point extraction apparatus 20, for example, may be a difference in algorithms related to extraction of feature points (operation of central line extraction part 202, feature point extraction part 203).

For example, in a case where a blank space of several dots is present on a ridge in the fingerprint image, a determination judging that the blank space is an interruption of the ridge, or judging that the blank space is noise and the ridge is not interrupted, differs between the two apparatuses. Since respective feature point extraction algorithms of the first feature point extraction apparatus 10 and the second feature point extraction apparatus 20 are different, the feature point sets outputted from the respective apparatuses are also often different. However, according to the quality of the fingerprint image and the algorithm used, the results outputted by the two feature point extraction apparatuses may be the same.

<Synthesizing Apparatus>

Figure 7:
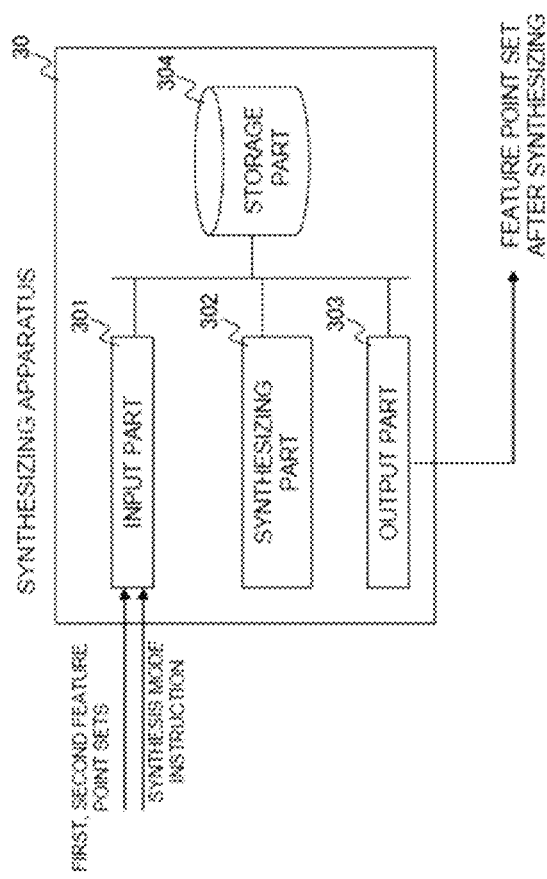
FIG. 7 is a diagram illustrating an example of a processing configuration of a synthesizing apparatus.

FIG. 7 is a diagram illustrating an example of a processing configuration of the synthesizing apparatus 30. Referring to FIG. 7, the synthesizing apparatus 30 is configured to include an input part 301, a synthesizing part 302, an output part 303 and a storage part 304.

The input part 301 is a means for inputting a plurality of feature point sets extracted according to respective methods (feature point extraction algorithms) from inputted images (fingerprint images) having a curved stripes pattern formed by ridges. Specifically, the input part 301 inputs two feature point sets (first and second feature point sets) and a synthesis mode instruction. The input part 301 delivers the obtained two feature point sets and the synthesis mode instruction to the synthesizing part 302.

The synthesizing part 302 is a means for synthesizing a plurality of feature point sets by executing a logical operation on the plural feature point sets. The synthesizing part 302 may execute various types of logical operation. The synthesizing part 302 executes a logical operation specified by the synthesis mode instruction from among plural logical operations. In the first example embodiment, the synthesizing part 302 executes any of a logical OR operation or a logical AND operation on the two feature point sets.

Figure 8A:
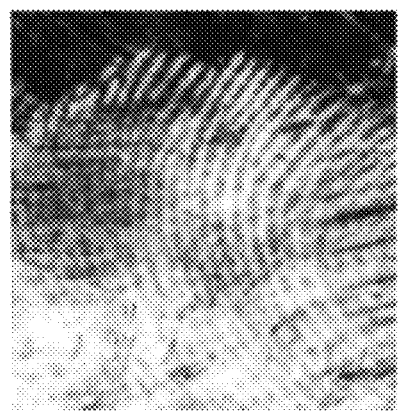
FIGS. 8A-8C are diagrams illustrating operations of a synthesizing part in the synthesizing apparatus.
Figure 8B:
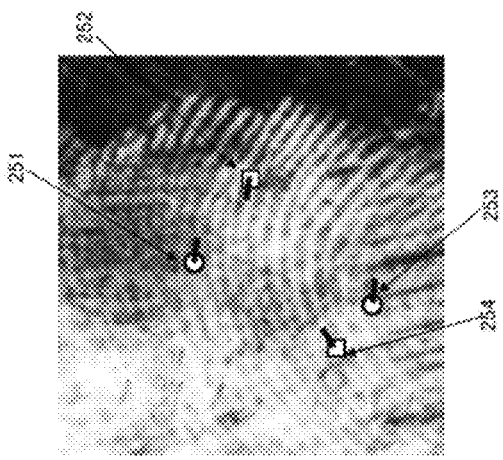
Figure 8C:
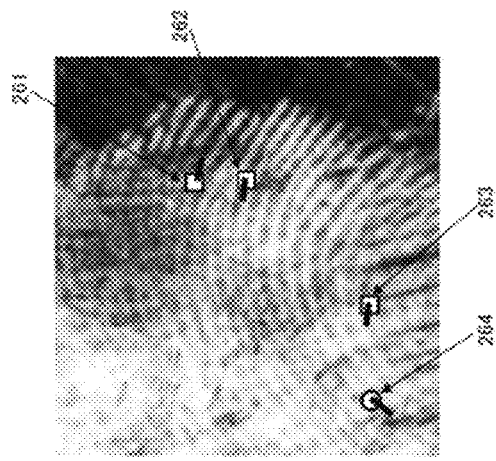

For example, when a feature point is extracted by the first feature point extraction apparatus 10 from the fingerprint image shown in FIG. 8A, a result as in FIG. 8B is obtained. In FIG. 8B, 4 feature points 251 to 254 are extracted. Similarly, when a feature point is extracted by the second feature point extraction apparatus 20 from the fingerprint image shown in FIG. 8A, a result as in FIG. 8C is obtained. In FIG. 8C, 4 feature points 261 to 264 are extracted.

The respective extraction results of FIGS. 8B and 8C are outputted to the synthesizing apparatus 30 as first and second feature point sets. FIG. 9A shows an example of a feature point set outputted by the first feature point extraction apparatus 10, and FIG. 9B shows an example of a feature point set outputted by the second feature point extraction apparatus 20.

Referring to FIGS. 8A-8C and FIGS. 9A and 9B, it is understood that feature point 252 and feature point 262 are feature points extracted at the same coordinate position, and types thereof are the same at branch points. Also, it is understood that feature point 253 and feature point 263 are feature points extracted at the same coordinate position, and types thereof differ.

The synthesizing part 302 executes a logical operation (logical OR operation or logical AND operation) on a plurality of feature point sets as shown in FIGS. 9A and 9B, and synthesizes two sets.

Next, a description is given concerning operations of the synthesizing part 302 in a case where the synthesis mode instruction indicates a logical OR operation of the feature point sets.

Figure 10:
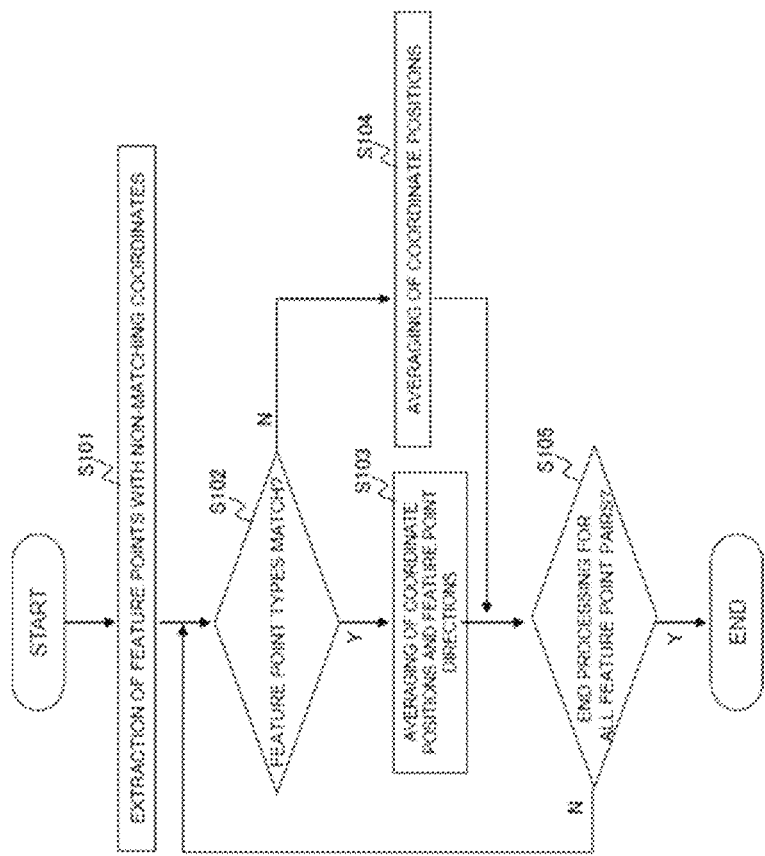
FIG. 10 is a flow chart illustrating an example of operations when the synthesizing part synthesizes 2 feature point sets by a logical OR operation.

FIG. 10 is a flow chart showing an example of operations when the synthesizing part 30 synthesizes two feature point sets by a logical OR operation.

The synthesizing part 302 extracts feature points belonging to one feature point set, with coordinates corresponding to another feature point set not existing (with non-matching coordinates) (step S101). It is to be noted that coordinates of the two feature points matching indicates that when differences between the two coordinates are calculated, it is within a prescribed range.

In the examples of FIGS. 8A-8C and FIGS. 9A and 9B, when step S101 is executed, feature point 251 and feature point 254 are extracted from the first feature point set, and feature point 261 and feature point 264 are extracted from the second feature point set. The extracted feature points are stored in the storage part 304 as elements (feature points) belonging to feature point sets after synthesis.

By the synthesizing part 302 executing processing of step S101, feature points belonging to respective feature point sets whose coordinate positions substantively match one another remain in two feature point sets. That is, the synthesizing part 302 extracts two feature point pairs whose coordinate positions substantively match each other. The synthesizing part 302, by executing processing of step S102 and following with regard to the feature point pairs, executes processing of synthesizing feature points where coordinate positions match (feature point synthesis processing).

First, the synthesizing part 302 confirms whether or not the types of the two feature points forming the feature point pair match (step S102).

Figure 11C:
FIGS. 11A-11C are diagrams illustrating operations of a synthesizing part in the synthesizing apparatus.
Figure 11B:
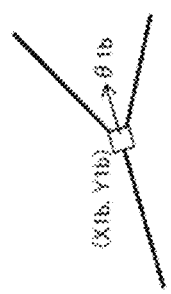
Figure 11A:
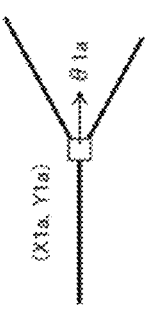

If the types of the feature points match (step S102, Yes branch), the synthesizing part 302 averages the coordinate positions and feature point directions of the two feature points (step S103). For example, the coordinate positions and feature point directions of the two feature points (branch points) shown in FIGS. 11A and 11B are averaged. The coordinates of feature points shown in FIG. 11A are (X1a, Y1a), and the feature point 520 direction is θ1a. The coordinates of feature points shown in FIG. 11B are (X1b, Y1b), and the feature point direction is θ1b.

The synthesizing part 302 averages the coordinate positions of the two feature points according to the following formula (1), and obtains coordinates (Xs, Ys).

$$(Xs, Ys) = \left( \frac{X1a + X1b}{2}, \frac{Y1a + Y1b}{2} \right) \quad (1)$$

Similarly, the synthesizing part 302 averages the 2 feature point directions according to the following formula (2), and obtains feature point direction θs.

$$\theta s = \frac{\theta 1a + \theta 1b}{2} \quad (2)$$

The synthesizing part 302 stores the averaged feature point coordinates and the feature point direction as feature points after synthesis in the storage part 304.

In the judgment in step S102, if the types of the two feature points do not match (step S102, No branch), the synthesizing part 302 averages the coordinate positions of the two feature points, and also sets the direction and type of the feature points after synthesizing to "unknown" (step S104).

The synthesizing part 302 confirms whether or not processing of feature point pairs extracted by execution of step S101 is finished (step S105), and if not finished, processing of step S102 and following is repeated.

In the examples of FIGS. 8A-8C and FIGS. 9A and 9B, since feature point 253 of FIG. 8B and feature point 263 of FIG. 8C have the same coordinate positions, if the coordinates are averaged, (X3, Y3) is obtained. On the other hand, since the types of the feature points at the abovementioned two coordinates differ from one another, attributes of the two feature points (feature point direction and type) are cleared, and the feature point direction and type of the feature points after synthesis are set to "unknown". The synthesizing part 302 sets the coordinates of the averaged feature point to the coordinates of the feature point after synthesis, and also sets the feature point type and the feature point direction to "unknown", to be stored in the storage part 304.

As described above, feature point synthesis processing executed by the synthesizing part 302 includes averaging at least the coordinate positions of feature points to be synthesized, irrespective of the type of feature points to be synthesized.

Figures 12A, 12B:
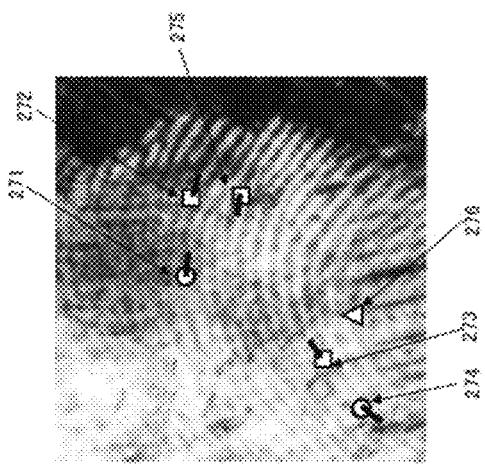
FIGS. 12A and 12B are diagrams illustrating operations of a synthesizing part in the synthesizing apparatus.

If the synthesizing part 302 executes synthesis processing according to a logical OR operation with respect to the two feature point sets shown in FIGS. 8A-8C and FIGS. 9A and 9B, the result shown in FIG. 12A is obtained. It is to be noted that in FIG. 12A, feature point direction and type that have been set to unknown as described above, are denoted by a symbol "-". The feature point direction θ26 of feature point 275 is an average value of feature point direction θ2 of feature point 252 and feature point direction θ6 of feature point 262.

Reflecting the result shown in FIG. 12A in FIG. 8A which is an input image, FIG. 12B is obtained. It is to be noted that the feature point with type set as unknown (feature point 276) is denoted by a white triangle.

Continuing, a description is given concerning a case where a synthesis mode instruction indicates a logical AND operation.

In this case also, a description is given taking as an example a case where a fingerprint image shown in FIG. 8A is inputted to the feature point extraction system, the first feature point extraction apparatus 10 extracts the feature points shown in FIG. 8B, and the second feature point extraction apparatus 20 extracts the feature points shown in FIG. 8C.

FIG. 13 is a flow chart showing an example of operations when the synthesizing part 302 synthesizes two feature point sets by a logical AND operation.

The synthesizing part 302 extracts pairs of feature points, respectively included in the two feature point sets, the feature points having coordinates that substantively match (overlap) (step S201). That is, in a case where the executed logical operation is a logical AND operation, by the synthesizing part 302 executing processing of step S201, feature point pairs, with feature points belonging to respective feature point sets, that have coordinate positions substantively matching one another are selected. For example, in the example of FIGS. 8A-8C, the pair of feature point 252 and feature point 262, and the pair of feature point 253 and feature point 263 are extracted.

Next, the synthesizing part 302 confirms whether or not the feature point types of the respective feature point pairs match (step S202).

If the feature point types match (step S202, Yes branch), the synthesizing part 302 averages the coordinate positions and feature point directions (step S203). Since the processing in question may be similar to the processing of step S103 of FIG. 10, a detailed description is omitted.

The synthesizing part 302 stores averaged feature point coordinates and feature point directions as feature points after synthesis, in the storage part 304.

If the types of the feature points do not match (step S202, No branch), the synthesizing part 302 averages the coordinate positions of the two feature points, and also sets the feature point directions and types with regard to the feature points after synthesizing to "unknown" (step S204). Since the processing in question may be similar to the processing of step S104 of FIG. 10, a detailed description is omitted.

The synthesizing part 302 sets the coordinates of the averaged feature points to the coordinates of the feature points after synthesis, and also sets the feature point types and the feature point directions to "unknown", to be stored in the storage part 304.

The synthesizing part 302 confirms whether or not processing of feature point pairs extracted in step S201 is finished (step S205), and if not finished, processing of step S202 and following is repeated.

Figures 14A, 14B:
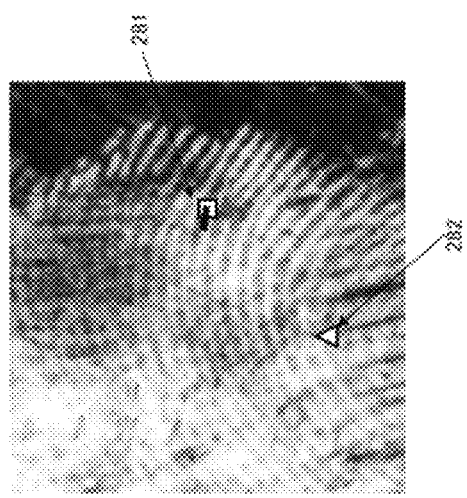
FIGS. 14A and 14B are diagrams illustrating operations of a synthesizing part in the synthesizing apparatus.

If the synthesizing part 302 executes synthesis processing according to a logical AND operation, with respect to the two feature point sets shown in FIGS. 8A-8C and FIGS. 9A and 9B, the result shown in FIG. 14A is obtained. Reflecting the result shown in FIG. 14A in FIG. 8A which is an input image, FIG. 14B is obtained.

The synthesizing part 302 delivers feature point sets after synthesis obtained by the abovementioned synthesis processing (information as shown in FIG. 12 A or FIG. 14A) to the output part 303. The output part 303 outputs the feature point set after synthesizing, as feature points (feature amount) corresponding to the fingerprint image inputted to the system, to an external apparatus. External apparatuses that are output destinations of the feature points in question relate to an authentication apparatus that performs individual authentication, a matching apparatus to identify an individual stored in a database, and the like.

Next, a description is given concerning operations of the feature point extraction system according to the first example embodiment, making reference to the drawings.

Figure 15:
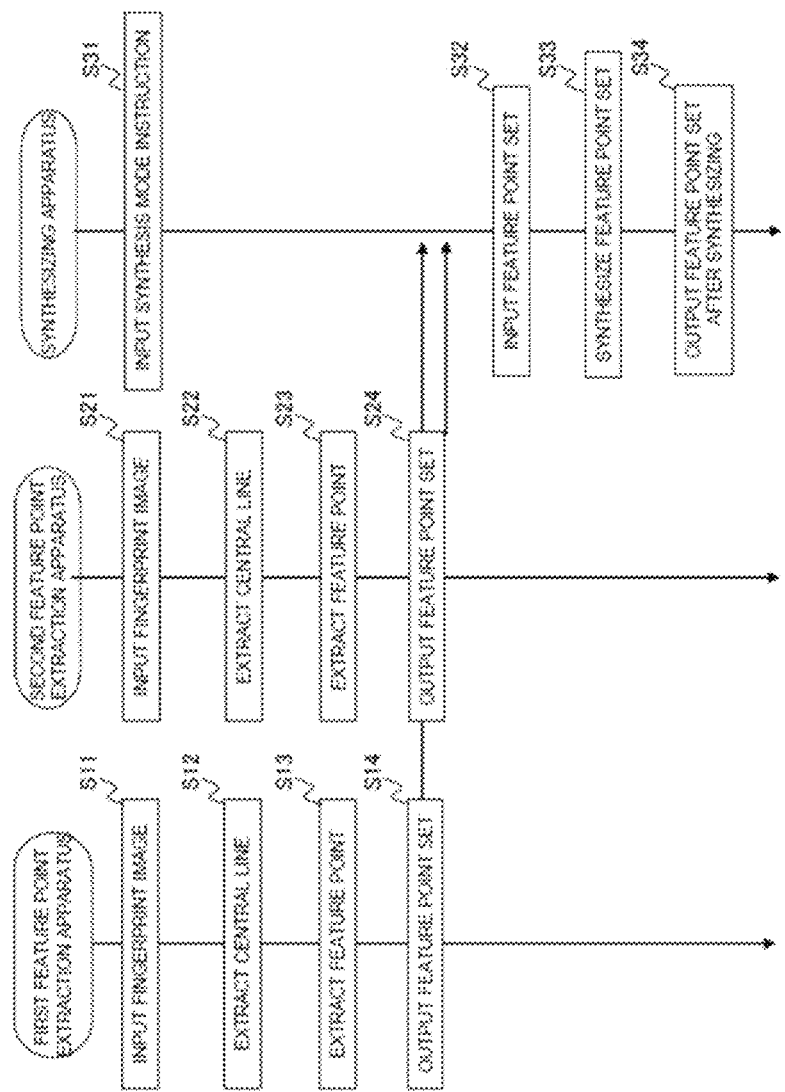
FIG. 15 is a sequence diagram illustrating an example of operations of a feature point extraction system according to the first example embodiment.

FIG. 15 is a sequence diagram illustrating an example of operations of a feature point extraction system according to the first example embodiment.

Fingerprint images are inputted to each of the first feature point extraction apparatus 10 and the second feature point extraction apparatus 20. (steps S11, S21). Thereafter, after central line extraction processing (steps S12, S22) and feature point extraction processing (step S13, S23), the first and second feature point sets are outputted (steps S14, S24).

The synthesizing apparatus 30, for example, inputs a synthesis mode instruction from an operator of the system (step S31). Thereafter, the synthesizing apparatus 30 inputs two feature point sets (step S32), and executes synthesis processing according to the synthesis mode instruction (step S33). The synthesizing apparatus 30 outputs the feature point set after synthesizing, to an external apparatus (step S34).

As described above, the synthesizing apparatus 30 according to the first example embodiment executes a logical operation (for example, logical OR operation, logical AND operation) on the feature point sets extracted according to a plurality of methods (algorithms), and a plurality of feature point sets are synthesized. On this occasion, in a case where for feature points belonging to feature point sets extracted by a plurality of methods, the coordinate positions substantively match each other, by executing predetermined synthesis processing (FIG. 10, steps S103, S104; FIG. 13 steps S203, S204) the synthesizing apparatus 30 executes synthesizing of feature points. The synthesis mode may be determined by a synthesis mode instruction by the synthesizing apparatus 30. As a result, a feature point set is obtained that matches usage object of feature points extracted from the first feature point extraction system.

For example, in a case where it is desired to comprehensively extract feature points from a first fingerprint image, a logical OR operation may be designated by the synthesis mode instruction. In this case, as shown in FIG. 12B, the feature points outputted by two feature point extraction apparatuses are selected without omission. In regard to this, in a case where it is desired to extract feature points of high quality from one fingerprint image, a logical AND operation may be designated by the synthesis mode instruction. In this case, as shown in FIG. 14B, feature points extracted commonly by two feature point extraction apparatuses are selected. The feature points extracted by the respective two apparatuses, that have different feature point extraction algorithms, may be said to have features as feature points confirmed even from any viewpoint, and they may be considered to be of high quality.

Second Example Embodiment

Next, a detailed description is given concerning a second example embodiment, making reference to the drawings.

There are various types of algorithm (feature point extraction algorithm) used when extracting feature points from a fingerprint image. For example, there is an algorithm that can make a ridge a central line with high accuracy if applied to an area with wide ridge width, and also there is an algorithm that can make a ridge a central line with high accuracy if applied to an area with narrow ridge width. Also, in one fingerprint image, areas where ridge width is wide and areas where ridge width is narrow are often mixed.

For this type of fingerprint image, applying synthesis processing according to the first example embodiment, there is a possibility of not obtaining a feature point set with sufficiently high quality. For example, as shown in the upper section of FIG. 16, a fingerprint image is assumed where an area with wide ridges and an area with narrow ridges are mixed. It is assumed that the first feature point extraction apparatus 10 executes an algorithm effective in an area where ridge width is wide (below, denoted algorithm A), and the second feature point extraction apparatus 20 executes an algorithm effective in an area where ridge width is narrow (below, denoted algorithm B).

Figure 16:
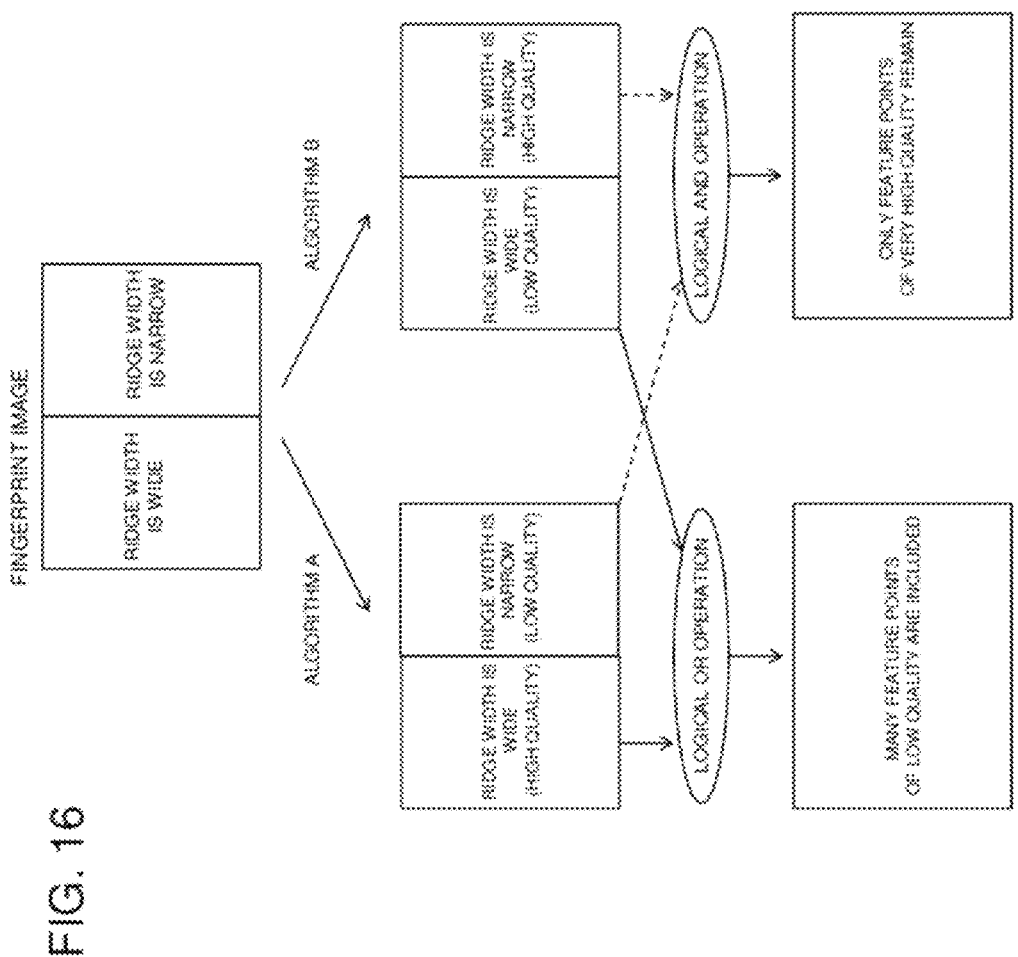
FIG. 16 is a diagram illustrating an example applying a plurality of algorithms to a fingerprint image.

In this case, if algorithm A is applied to the fingerprint image shown in the upper section of FIG. 16, the result of extracting an area with a wide ridge width is of high quality, but the result of extracting an area with a narrow ridge width is of low quality (refer to the mid-section of FIG. 16, left side). Meanwhile, if algorithm B is applied to the fingerprint image shown in the upper section of FIG. 16, opposite results are obtained (refer to the mid-section of FIG. 16, right side).

If a logical OR operation is executed by the synthesizing apparatus 30 with respect to the two feature point sets shown in the mid-section of FIG. 16, feature points extracted by the two algorithms are comprehensively extracted. However, in this case many feature points extracted by any one of the algorithms remain, and the quality of such feature points is not necessarily high. That is, in a case of overall consideration of the feature point sets after synthesizing, it cannot necessarily be said that high quality feature point sets are realized.

Similarly, if a logical AND operation is executed by the synthesizing apparatus 30 on a fingerprint image shown in the mid-section of FIG. 16, extraction is limited to feature points commonly extracted by the two algorithms. However in this case, there may be a possible occasion of a case where only feature points of very high quality remain, and a state may occur where feature points of relatively high quality do not remain. In this case also, in a case of overall consideration of the feature point sets after synthesizing, it cannot necessarily be said that high quality feature point sets are generated.

Taking the above situation into account, in the second example embodiment a synthesizing apparatus 30a is provided that extracts feature points of overall high quality (feature point sets after synthesizing).

Specifically, the synthesizing apparatus 30a according to the second example embodiment inputs three or more feature point sets, and by hierarchically executing synthesis processing a number of times, feature points of overall high quality are extracted.

Figure 17:
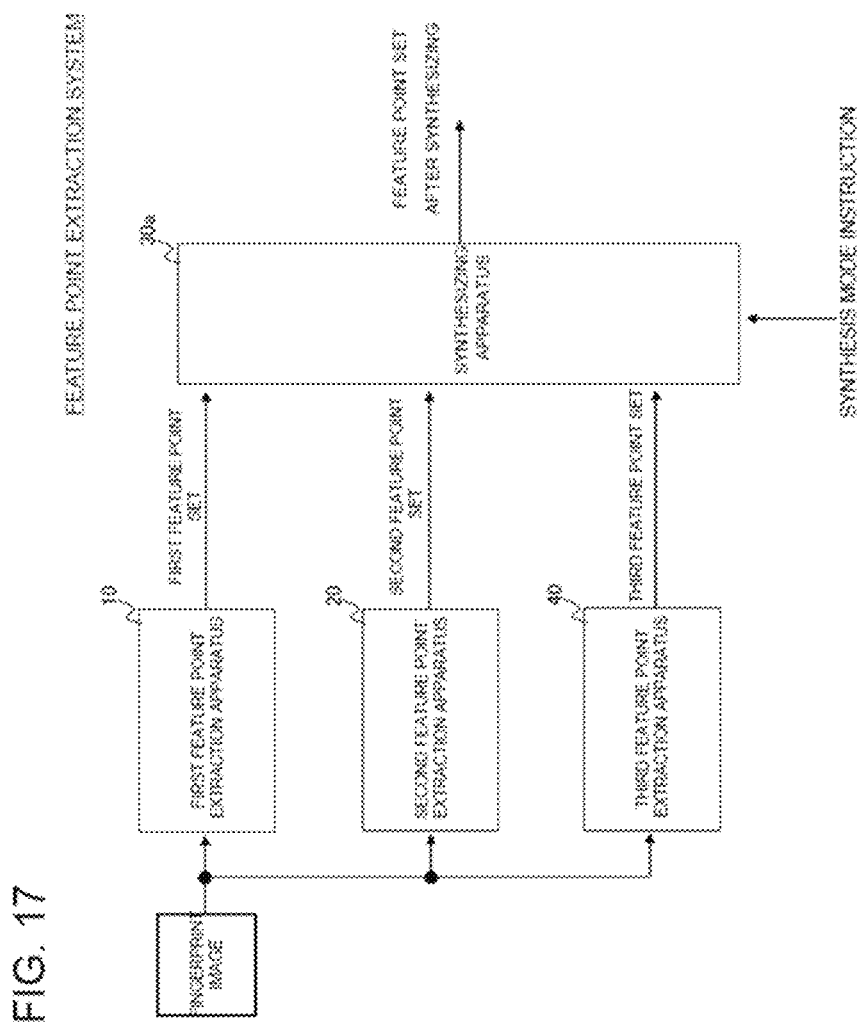
FIG. 17 is a diagram illustrating an example of a configuration of a feature point extraction system according to a second example embodiment.

FIG. 17 is a diagram illustrating an example of a feature point extraction apparatus configuration according to the second example embodiment. In the system shown in FIG. 17, a third feature point extraction apparatus 40 is added.

The third feature point extraction apparatus 40 is an apparatus that extracts a feature point from a fingerprint image, similar to the first feature point extraction apparatus 10 and the second feature point extraction apparatus 20. Thus a description concerning configuration and operations of the third feature point extraction apparatus 40 is omitted.

Feature points (a feature point set) extracted by the third feature point extraction apparatus 40 are denoted as a third feature point set.

Feature point extraction algorithms executed by the respective feature point extraction apparatuses are as follows. The first feature point extraction apparatus 10 deals with algorithm A (effective when ridge width is wide). The second feature point extraction apparatus 20 deals with algorithm B (effective when ridge width is narrow). The third feature point extraction apparatus 40 deals with an algorithm C, and the algorithm C has a feature (almighty or powerful quality) intermediate between algorithms A and B.

Since the basic configuration and operations of the synthesizing apparatus 30a according to the second example embodiment may be the same as content described in the first example embodiment, a detailed description is omitted. The synthesizing apparatus 30a according to the second example embodiment differs from the synthesizing apparatus 30 according to the first example embodiment in the point of dealing with three or more feature point sets, and the point of executing synthesis processing multiple times.

A description is given below concerning the synthesizing part 302a (not shown) of the synthesizing apparatus 30a.

Figure 18:
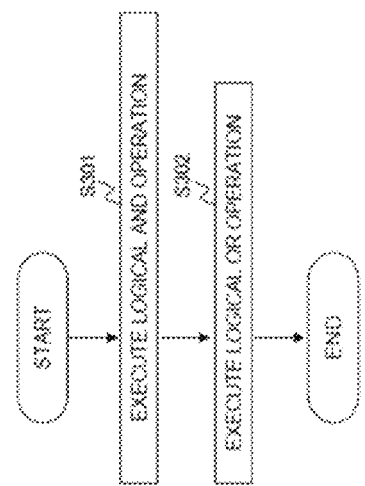
FIG. 18 is a flowchart illustrating an example of operations of the synthesizing part.

FIG. 18 is a flowchart showing an example of operations of the synthesizing part 302a according to the second example embodiment.

First, on obtaining three feature point sets the synthesizing part 302a executes synthesizing with respect to a logical AND operation, for each feature point set pair (pair of feature point sets selected from a plurality of feature point sets) (step S301).

Next, the synthesizing part 302a executes synthesizing with respect to a logical OR operation for each respective feature point set after synthesizing, obtained by executing the previous step (step S302).

When the synthesis processing according to the abovementioned steps S301, S302 is represented by a calculation formula, the following formula (3) applies.

$$(Ag\&\&Bg) \| (Ag\&\&Cg) \| (Bg\&\&Cg) \qquad (3)$$

It is to be noted that Ag indicates a first feature point set (a set obtained according to algorithm A), Bg indicates a second feature point set (a set obtained according to algorithm B), Cg indicates a third feature point set (a set obtained according to algorithm C). Furthermore, "&&" denotes a "logical AND" operation.

According to the abovementioned formula (3), there remains only what is common in feature points obtained by two different algorithms (feature point set pairs), by synthesizing with regard to a first logical AND operation. That is, only good quality feature points common to the two algorithms are extracted. Thereafter, in formula (3), synthesizing with respect to a logical OR operation is executed for feature point sets obtained by synthesizing according to a logical AND operation, and high quality feature points are collected. As a result, if synthesis processing according to formula (3) is executed, sets (feature point sets after synthesizing) are generated that include high quality feature points, being feature points extracted according to algorithms A to C.

It is to be noted that the abovementioned description does not refer to a synthesis mode instruction, but execution of processing equivalent to formula (3) by the synthesizing apparatus 30a may be predetermined, and a logical formula equivalent to formula (3) may be inputted as a synthesis mode instruction. Synthesis processing executed by the synthesizing apparatus 30a is not limited to formula (3), and for example, synthesis processing according to formula (4) below, simplifying formula (3), may be executed.

$$(Ag\&\&Cg) \| (Bg\&\&Cg) \qquad (4)$$

Formula (4) indicates performing a logical AND operation on feature point set pairs of each of algorithms A and C, and algorithms B and C, and thereafter, performing a logical OR operation on a result of the logical AND operation. Furthermore, "&&" denotes a "logical AND" operation.

Here, confirming formula (3), if feature point extraction algorithms applied to fingerprint images are increased, and among feature points extracted by various algorithms only those of high quality are collected, it is clear that higher quality feature point sets are obtained. However, in this case, due to problems such as processing time for executing the respective algorithms, a problem may occur whereby a long time is taken from inputting a fingerprint image to the system to extracting final feature points (feature point sets after synthesizing). Therefore, as a synthesis mode instruction, the synthesizing apparatus 30a may be configured to receive, for example, "highest quality mode", "high quality mode", and "low quality mode", and content of synthesis processing or algorithm used in synthesis processing (combinations of logical AND operation etc.) may be modified adapted for respective modes. For example, separate usage may be performed so that synthesis processing equivalent to formula (3) is executed in "highest quality mode", and synthesis processing equivalent to formula (4) is executed in "high quality mode". As a result thereof, it is possible to realize balance between processing time required for feature point extraction and quality of feature points obtained.

As described above, with the synthesizing apparatus 30a according to the second example embodiment, by executing hierarchical logical operations a number of times with regard to a plurality of feature point sets, it is possible to extract feature points (feature point sets) of overall high quality.

Third Example Embodiment

Next, a detailed description is given concerning a third example embodiment, making reference to the drawings.

In the third example embodiment, a description is given concerning a case of outputting central line information corresponding to feature point sets after synthesizing, along with feature point sets, to an external apparatus.

Figure 19:
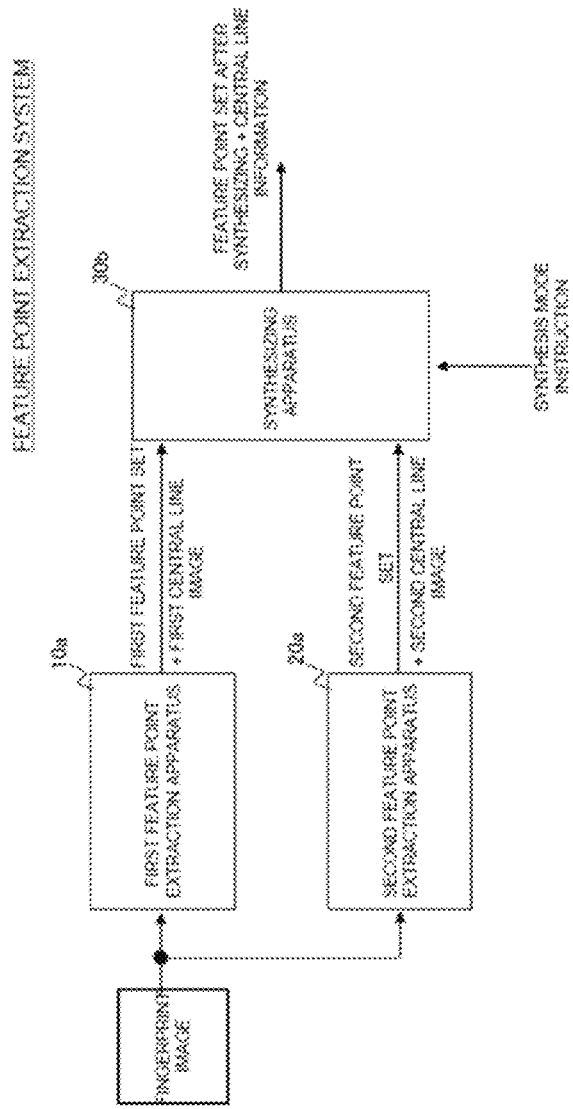
FIG. 19 is a diagram illustrating an example of a configuration of a feature point extraction system according to a third example embodiment.

FIG. 19 is a diagram illustrating an example of a feature point extraction apparatus configuration according to the third example embodiment.

With regard to the first feature point extraction apparatus 10a, a function is added to output to the synthesizing apparatus 30b a first central line image used in extracting feature points in the first feature point extraction apparatus 10 described in the first example embodiment. Similarly, the second feature point extraction apparatus 20a has a function to output the second central line image to the synthesizing apparatus 30b. The synthesizing apparatus 30b is further provided with a function to generate central line information based on 2 central line images. It is to be noted that central line information is information indicating the number of ridges between feature points belonging to a feature point set after synthesizing.

Figure 20:
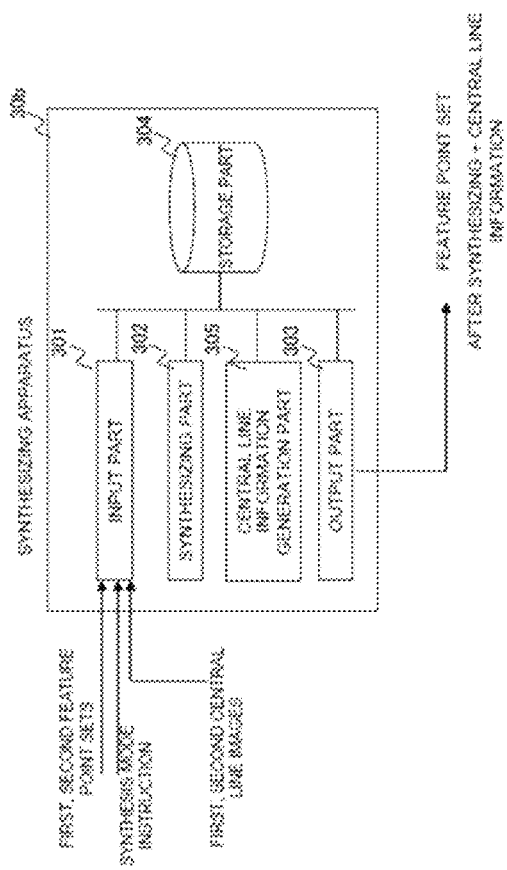
FIG. 20 is a diagram illustrating an example of a processing configuration of a synthesizing apparatus according to the third example embodiment.

FIG. 20 is a diagram illustrating an example of a processing configuration of the synthesizing apparatus 30b. Referring to FIG. 20, the synthesizing apparatus 30b is further provided with a central line information generation part 305, in addition to the configuration of the synthesizing apparatus 30 shown in FIG. 7.

The central line information generation part 305 is a means for generating central line information related to feature point sets after synthesizing, based on a plurality of central line images respectively corresponding to a plurality of feature point sets. Specifically, the central line information generation part 305 reflects the feature point sets after synthesizing in respective central line images. It is to be noted that reflecting the feature point sets after synthesizing the central line images relates to obtaining coordinate positions of feature points belonging to the feature point sets after synthesizing, and setting feature points at a place corresponding to the coordinate positions in the central line images.

Next, the central line information generation part 305 counts the number of ridges between feature points in the central line image reflecting the feature points. Thereafter, the central line information generation part 305 generates as central line information an average value of the number of ridges between feature points counted from respective central line images.

Figure 21B:
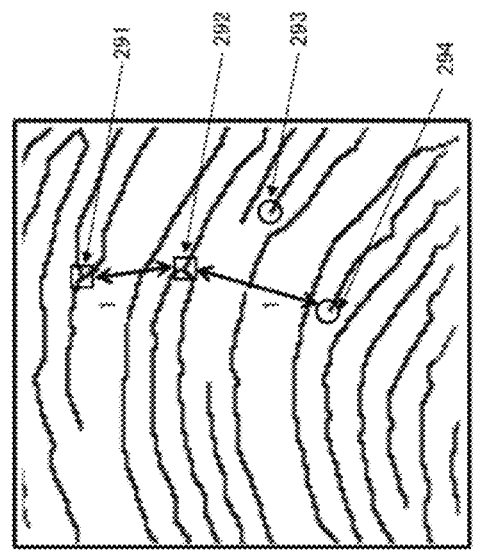
FIGS. 21A and 21B are diagrams illustrating the number of ridges between feature points.
Figure 21A:
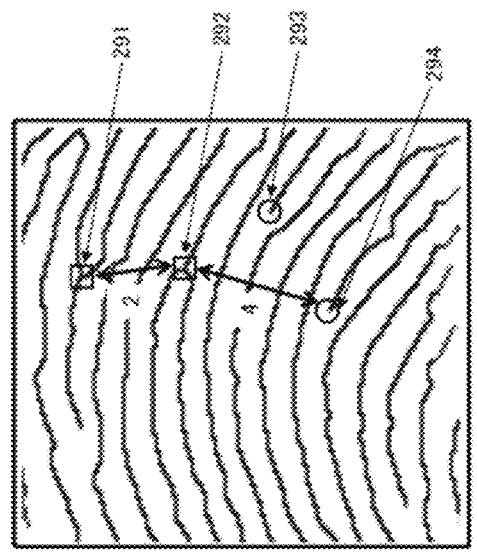

For example, a central line image shown in FIG. 21A as a first central line image, is obtained from the first feature point extraction apparatus 10a. Feature points 291 to 294 after synthesizing that have been generated by synthesis processing are reflected in FIG. 21A. In this case, for example, the number of ridges between feature point 291 and feature point 292 is calculated as "2". Similarly, the number of ridges between feature point 292 and feature point 294 is calculated as "4".

The central line information generation part 305 reflects feature point sets after synthesizing, in a second central line image, and calculates the number of ridges between feature points obtained from the diagram in question. For example, a central line image shown in FIG. 21B is obtained as the second central line image, and if some of the number of ridges between the central lines are counted, the situation is as in FIG. 21B.

The central line information generation part 305 calculates the average value of the number of ridges between the feature points corresponding to the two central lime images respectively, as central line information corresponding to feature point sets after synthesizing. For example, since the number of ridges of feature point 291 and feature point 292 in the first central line image is "2", and the number of ridges between feature point 291 and feature point 292 in the second central line image is "1", the average value of the number of ridges between feature point 291 and feature point 292 image is "1.5".

The central line information generation part 305 applies the abovementioned processing of calculating the number of ridges between feature points and processing of calculating the average value of the number of ridges between feature points, to all feature points, and generates central line information. The generated central line information is outputted to an external apparatus via the output part 303. In the external apparatus, by handling the central line information as a feature amount characterizing a fingerprint image, usage is possible for individual authentication or individual identification.

As described above, in the third example embodiment, in addition to a feature point set after synthesizing, it is possible to output the number of ridges between feature points corresponding to the feature point set in question, as central line information, to the external apparatus. As a result, it is possible to improve accuracy of matching processing using the information in question.

Application Example

Next, a description is given concerning practical use of feature points obtained by synthesizing apparatuses according to the first to third example embodiments.

For example, it is possible to build a matching system according to feature point sets outputted by a synthesizing apparatus according to the first to third example embodiments. For example, high quality feature points are extracted by the synthesizing apparatus 30a according to the second example embodiment and recorded in a database. Feature points are extracted by the synthesizing apparatus 30a from a fingerprint image that is a target for matching, and used as matching data. In this case, it is possible to perform matching processing using high quality feature points a small number of times. In the example of the abovementioned second example embodiment, three algorithms A to C are used, and one feature point set is generated. If there is an intention to obtain the same level of accuracy as in matching using a feature point set after synthesizing, matching processing by respective algorithms A to C must be done three times. In contrast, in the second example embodiment, since high quality feature points according to the three algorithms A to C are integrated as one feature point set, it is sufficient to execute matching processing once.

The feature point set obtained by a logical AND operation in the first example embodiment can be used in synthesizing a plurality of fingerprint images. Specifically, for each fingerprint image, feature point sets are extracted by a logical AND operation described in the first example embodiment. Thereafter, areas are calculated with common feature points among the extracted feature point sets. The feature point sets obtained by the logical AND operation are of high quality, and areas in which such high quality feature points exist in common may be taken as common portions of a fingerprint image obtained from the same individual. Therefore, with regard to a plurality of fingerprint images, by image modification to have common areas overlap, it is possible to synthesize one fingerprint image from a plurality of images.

Modified Example

It is to be noted that the configuration of the feature point extraction system described in the first to third example embodiments (FIG. 2, FIG. 17, FIG. 19) is exemplary, and there is no intention to limit the configuration of the system.

For example, functions of the feature point extraction apparatus may be built into a synthesizing apparatus.

Or, a feature point extraction apparatus need not be included in the feature point extraction system. For example, feature point sets extracted from the same fingerprint image by a plurality of examiners may be inputted to the synthesizing apparatus 30. In this case also, the synthesizing apparatus 30 synthesizes a plurality of feature point sets by a method described in the first to third example embodiments, and it is possible to generate one feature point set.

A feature point set that is a target of the synthesizing apparatus 30 may be extracted by any method. As described above, manual extraction of a plurality of feature point sets from a fingerprint image by an examiner may be a target for synthesis, or there may be a mixture of manually extracted feature point sets and feature point sets extracted automatically by an apparatus. Or, the result of an examiner correcting a feature point, which has been automatically extracted by an apparatus, may be used as a feature point set. That is, feature point sets extracted by different methods or algorithms may be targets for synthesizing by the synthesizing apparatus 30.

In the first example embodiment a description was given of a case of synthesizing two feature point sets, but the number of synthesized feature point sets is not limited to two. Clearly it is possible for three or more feature point sets to be targets for synthesizing. By increasing the feature point sets that are targets for synthesizing, it is possible to improve requirements for a feature point set, such as feature point completeness or accuracy.

In the abovementioned example embodiments a description was given concerning cases of inputting fingerprint images, but images that can be handled by the feature point extraction system are not limited to fingerprint images. An image formed by curved stripes of ridges such as a palm print or the like is also possible.

In the abovementioned example embodiments, a description was given where feature points belonging to a feature point set are provided with attributes such as feature point direction or type, but feature points belonging to the feature point set need not be provided with these attributes. The feature point set may be simply a collection of feature points.

In multiple flowcharts that use the abovementioned description, a plurality of steps (processes) were described in order, but the order of executing the steps executed in the respective example embodiments is not limited to the order described. In the various example embodiments, modification of the order of the illustrated steps is possible within a scope that does not interfere with content, such as executing the respective processes in parallel. The various example embodiments described above may be combined within a scope that does not conflict with the content.

It is possible to have a computer function as a synthesizing apparatus by installing the abovementioned computer program in the computer storage part. In addition, by causing the abovementioned computer program to execute a computer, it is possible to execute a synthesizing method for feature point sets by the computer.

Some of all of the abovementioned example embodiments may also be described as in the following, but there is no limitation thereto.
<Mode 1>
As in the synthesizing apparatus according to the first aspect described 1045 above.

<Mode 2>
The synthesizing apparatus preferably according to the mode 1, wherein the synthesizing part executes a logical OR operation on the plurality of feature point sets.
<Mode 3>
The synthesizing apparatus preferably according to mode 1 or 2, wherein the synthesizing part executes a logical AND operation on the plurality of feature point sets.
<Mode 4>
The synthesizing apparatus preferably according to any one of modes 1 to 3, wherein the synthesizing part executes at least 2 logical operations on the plurality of feature point sets.
<Mode 5>
The synthesizing apparatus preferably according to mode 4, wherein the synthesizing part hierarchically executes at least 2 logical operations.
<Mode 6>
The synthesizing apparatus preferably according to any one of modes 1 to 5, wherein the synthesizing part, for feature points respectively belonging to the plurality of feature point sets, in a case of coordinate positions substantively matching each other, performs processing to synthesize the feature points whose coordinate positions match, and the processing to synthesize the feature points includes averaging coordinate positions of at least the feature points to be synthesized.
<Mode 7>
The synthesizing apparatus preferably according to mode 6, wherein the processing to synthesize the feature points further includes processing to average feature point directions characterizing the direction of the feature points whose coordinate positions match.
<Mode 8>
The synthesizing apparatus preferably according to mode 6 or 7, wherein the processing to synthesize the feature points further includes processing to set the type of feature points after synthesizing as unknown, in a case where types differ for the feature points whose coordinate positions match.
<Mode 9>
The synthesizing apparatus preferably according to any one of modes 1 to 8, wherein the synthesizing part executes a logical AND operation on a pair of feature point sets selected from the plurality of feature point sets, and executes a logical OR operation on feature point sets after execution of the logical AND operation.
<Mode 10>
The synthesizing apparatus preferably according to any one of modes 1 to 9, further comprising a central line information generation part that generates central line information related to the feature point sets after synthesizing, based on a plurality of central line images corresponding respectively to the plurality of feature point sets.
<Mode 11>
The synthesizing apparatus preferably according to mode 10, wherein the central line information generation part reflects feature points belonging to the feature point sets after synthesizing, respectively in the plurality of central line images, counts the number of ridges between feature points in the central line images reflecting the feature points, and generates, as the central line information, an average value of the number of ridges between the feature points counted respectively from the plurality of central line images.
<Mode 12>
As in the synthesizing method according to the second aspect described above.

<Mode 13>

As in the program according to the third aspect described above.

It is to be noted that mode 12 and mode 13 may be extended with regard to the mode 1 to mode 11, similar to mode 1.

It is to be noted that the respective disclosures of the cited Patent Literature described above are incorporated herein by reference thereto. Modifications and adjustments of example embodiments and examples may be made within the bounds of the entire disclosure (including the scope of the claims) of the present invention, and also based on fundamental technological concepts thereof. Various combinations and selections of various disclosed elements (including respective elements of the respective claims, respective elements of the respective example embodiments and examples, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 10, 10a first feature point extraction apparatus
11 CPU (Central Processing Unit)
12 memory
13 input output interface
14 NIC (Network Interface Card)
20, 20a second feature point extraction apparatus
30, 30a, 30b, 100 synthesizing apparatus
40 third feature point extraction apparatus
101, 201, 301 input part
102, 302, 302a synthesizing part
202 central line extraction part
203 feature point extraction part
204, 303 output part
205, 304 storage part
211-222, 231, 241, 251-254, 261-264, 271-276, 281, 282, 291-294 feature points
232, 242 feature point direction
305 central line information generation part

The invention claimed is:

1. A synthesizing apparatus, comprising:
at least one memory storing instructions; and
at least one processor configured to execute the instructions to:
receive an input image of a fingerprint;
input a plurality of feature point sets extracted from the input image, wherein the fingerprint in the input image has a curved stripes pattern formed by ridges, and the plurality of feature point sets include at least one information on type, position and direction;
synthesize the plurality of feature point sets into one synthesized feature point set about at least one information on type, position and direction,
wherein the one synthesized feature point set is synthesized by synthesizing feature points into one or more synthesized feature points by averaging coordinate positions of the feature points, wherein the feature points respectively belong to the plurality of feature point sets and coordinate positions of the feature points substantially match each other.

2. The synthesizing apparatus according to 1, wherein the processor is configured to execute a logical operation on the plurality of feature point sets.

3. The synthesizing apparatus according to 2, wherein the processor is configured to execute a logical OR operation on the plurality of feature point sets.

4. The synthesizing apparatus according to 2, wherein the processor is configured to execute a logical AND operation on the plurality of feature point sets.

5. The synthesizing apparatus according to 2, wherein the processor is configured to execute at least two or more logical operations on the plurality of feature point sets.

6. The synthesizing apparatus according to 5, wherein the processor is configured to hierarchically execute at least two or more logical operations.

7. The synthesizing apparatus according to 1, wherein the feature points are synthesized into the one or more synthesized feature points by averaging feature point directions characterizing the directions of the feature points having coordinate positions that match each other.

8. The synthesizing apparatus according to 1, wherein the processor is configured to set a type of the one or more synthesized feature points as unknown, in a case where types of the feature points having coordinate positions that match each other are different from one another.

9. The synthesizing apparatus according to 1, wherein the processor is configured to execute a logical OR operation and a subsequent logical AND operation on a pair of feature points selected from the plurality of feature point sets.

10. The synthesizing apparatus according to claim 1, wherein
the processor is further configured to generate central line information related to the one or more synthesized feature points, based on a plurality of central line images corresponding respectively to the plurality of feature point sets.

11. The synthesizing apparatus according to 10, wherein the processor is configured to
reflect the one or more synthesized feature points belonging to the one synthesized feature point set respectively to the plurality of central line images,
count a number of the ridges between a first synthesized feature point and a second synthesized feature point in the central line images in which the one or more synthesized feature points are reflected, and
generate, as the central line information, an average value of the number of ridges between the first synthesized feature point and the second synthesized feature point counted respectively from the plurality of central line images.

12. A synthesizing method comprising:
receiving, by a processor, an input image of a fingerprint;
inputting, by the processor, a plurality of feature point sets extracted from the input image, wherein the fingerprint in the input image has a curved stripes pattern formed by ridges, and the plurality of feature point sets include at least one information on type, position and direction;
synthesizing, by the processor, the plurality of feature point sets into one synthesized feature point set about at least one information on type, position and direction,
wherein the one synthesized feature point set is synthesized by synthesizing feature points into one or more synthesized feature points by averaging coordinate positions of the feature points, wherein the feature points respectively belong to the plurality of feature point sets and coordinate positions of the feature points substantially match each other.

13. A non-transitory computer-readable recording medium storing thereon a program that when executed by a computer causes the computer to execute processing comprising:

receiving an input image of a fingerprint;

inputting a plurality of feature point sets extracted from the input image, wherein the fingerprint in the input image has a curved stripes pattern formed by ridges, and the plurality of feature point sets which include at least one information on type, position and direction;

synthesizing the plurality of feature point sets into one synthesized feature point set about at least one information on type, position and direction, wherein the one synthesized feature point set is synthesized by synthesizing feature points into one or more synthesized feature points by averaging coordinate positions of the feature points, wherein the feature points respectively belong to the plurality of feature point sets and coordinate positions of the feature points substantially match each other.

* * * * *